United States Patent [19]

Niijima et al.

[11] Patent Number: 5,734,816
[45] Date of Patent: Mar. 31, 1998

[54] NONVOLATILE MEMORY WITH FLASH ERASE CAPABILITY

[75] Inventors: Hideto Niijima, Tokyo; Takashi Toyooka, Kawasaki, both of Japan

[73] Assignee: International Business Machines Corporation, Armonk, N.Y.

[21] Appl. No.: 212,469

[22] Filed: Mar. 10, 1994

[30] Foreign Application Priority Data

Mar. 11, 1993 [JP] Japan ............... 5-050247

[51] Int. Cl.⁶ ............................................. G06F 11/00
[52] U.S. Cl. ............. 395/182.06; 395/428; 365/185.33; 365/185.29
[58] Field of Search ............ 395/182.06, 182.03, 395/182.04, 428, 430, 489; 371/21.6; 365/218, 230.01, 185.29, 185.06, 185.33

[56] References Cited

U.S. PATENT DOCUMENTS

| | | | |
|---|---|---|---|
| 4,001,883 | 1/1977 | Strout et al. | 360/48 |
| 5,031,168 | 7/1991 | Moore | 369/59 |
| 5,063,364 | 11/1991 | Atwood et al. | 365/185 |
| 5,341,339 | 8/1994 | Wells | 365/218 |
| 5,406,529 | 4/1995 | Asano | 365/230.03 |
| 5,437,020 | 7/1995 | Wells et al. | 395/425 |
| 5,457,658 | 10/1995 | Niijima et al. | 365/218 |
| 5,479,633 | 12/1995 | Wells et al. | 395/430 |
| 5,581,723 | 12/1996 | Hasbun et al. | 395/430 |
| 5,598,370 | 1/1997 | Niijima et al. | 365/185.33 |
| 5,630,093 | 5/1997 | Holzhammer et al. | 395/442 |

FOREIGN PATENT DOCUMENTS

| | | | |
|---|---|---|---|
| 0392895 | 10/1990 | European Pat. Off. | G11C 16/06 |
| 0522780 | 1/1993 | European Pat. Off. | G06F 3/06 |
| 2251324 | 7/1992 | United Kingdom | G06F 12/02 |

*Primary Examiner*—Robert W. Beausoliel, Jr.
*Assistant Examiner*—Joseph E. Palys
*Attorney, Agent, or Firm*—Matthew J. Bussan; Karuna Ojanen

[57] ABSTRACT

A nonvolatile memory with flash erase capability includes a plurality of clusters each having a plurality of sectors, each of the sectors holding the attribute information for identification. A cluster information sector is placed at the top of a cluster to which it belongs. A data sector is placed in a data area which is the region other than the top of the cluster. A controller connected to the nonvolatile memory creates a cluster information copy sector when erasing a cluster, and reconstructs cluster management information from the cluster information copy sector when initializing a cluster, thereby forming a cluster information sector. Accordingly, endurance against failure such as power failure in a solid state file apparatus using the nonvolatile memory is improved.

16 Claims, 18 Drawing Sheets

NONVOLATILE MEMORY WITH FLASH ERASE CAPABILITY

BACKGROUND OF THE INVENTION

1. Field of the Invention

The present invention relates to a nonvolatile memory with flash erase capability such as a flash EEPROM (hereinafter referred to as a flash memory) and a solid state file apparatus using the same, and more particularly to saving, recovering and updating the control information such as erase counts of a cluster.

2. Description of the Prior Art

A flash memory has been developed as a memory used for a solid state file apparatus. Its memory element is composed of one transistor as a DRAM so that it can be packaged at high density, and it is expected to have a bit cost equivalent to, or less than, that of a DRAM (low cost, large capacity), depending on the future market. The memory element is nonvolatile and does not require a battery backup. Erasure is generally performed for each chip or for each smaller block. The outline of such a flash memory is introduced by Richard D. Pashley et al. in "Flash Memories: the best of two worlds," IEEE SPECTRUM, December 1989, pp. 30–33. As far as performance is concerned, the block erase type is superior to the chip erase type.

When the flash memory of block erase type is used for a solid state file (SSF), it is convenient for memory management if the size of a block is made equal to a sector, which is a unit of access in the magnetic disk apparatus. European Patent Application 392895, for example, discloses a flash EEPROM system of the sector erase type. The system makes it possible to simultaneously erase any plural sectors by providing a latch for each sector, which is a unit of erasure, and setting a latch corresponding to a sector to be erased.

Also known is a flash memory whose unit of erasure is a block having a size equivalent to a plurality of sectors (e.g. 4K bytes). Furthermore, it is possible to make a cluster including a plurality of blocks, each of which is a physical erase unit, a logical erase unit.

However, the flash memory has limitations which SRAMs and DRAMs do not have. First, the programming of memory bits is a one-way process and change is allowed only from 0 to 1 or from 1 to 0. Therefore, when new data is to be written to a memory location which has already been written, writing should be performed after a block including that memory location is erased to an all 0 or all 1 state. It is usually takes from several tens of milliseconds to several seconds for erasure and writing. Furthermore, the flash memory is deteriorated by erasure and writing and reaches a use limit, at present, after several tens of thousands to several hundreds of thousands of erasures and writings.

To cope with such problems, it is necessary to save the erase counts for each block so as not to exceed the upper limit of the erase counts. In addition, as disclosed in Japanese Patent Appln. No. 3-197318, it is necessary to provide such measures so that bad sectors in a cluster, the locations of which have been previously stored, are skipped when physical sectors are dynamically assigned to logical sectors. Although there arises such a situation where control information describing the state of flash memory should be held in the flash memory itself, because of the characteristics of the flash memory, such control information is erased at the same time data is erased. Usually, such control information is copied in a RAM area of the controller for SSF prior to its erasure, and written back into the flash memory after the blocks are erased. However, when such an approach is employed, if a system failure such as power failure should happen during erasure of clusters, the control information on the RAM is lost and the controller cannot recover it.

In addition, block failure may occur in the flash memory because of its construction. Such a block failure may prevent the system from reading the control information. If the control information is lost due to such a failure mode, not only does the system lose the data in that block, but it may also become impossible to control the integrity of the entire SSF. To date, no effective method has been proposed for data protection management against a block failure.

The control information includes data very critical for managing the system such as the erase count of a block which is never recovered once lost so that loss of it causes a severe problem in controlling the system. There has been no measures which can cope with a plurality of failure modes in protecting data which should be held at all times.

In addition, when a physical sector for holding the control information is determined at a fixed location, if a failure should occur in that sector, the entire block or cluster controlled by the control information becomes unusable. That is, there arises such inefficiency that a failure in a critical sector causes an area several tens times greater to fail logically although there is no physical failure. To prevent this, there is a method to provide a replacement sector for a critical sector. In this case, however, it is necessary to store in the system where the replacement sector is. In general, the information about the replacement sector is required to be stored on a flash memory. In consideration of the characteristics of flash memories, this information should be stored in a suitable sector belonging to a cluster containing the sector to be alternated. Under such conditions, the information on the location of replacement sector in view of its nature may be stored in the flash memory as part of control information. However, such an approach causes a contradiction in that to locate the control information requires the information to refer to itself (for the location of the replacement sector). To date, no effective measures have been proposed for such a situation.

In addition, it becomes necessary to update the control information (bad sector map) due to the occurrence of a new bad sector or the like. However, because, in general, the flash memory cannot be overwritten, the update should wait until the control information is written back after the completion of erasure of that cluster. The problem of how such an update transaction should be held until the completion of update processing is also yet unsolved.

SUMMARY OF THE INVENTION

Accordingly, an object of this invention is to reliably attain, save, and update control information which is essential to assuring the reliability of a solid state file apparatus (SSF) using nonvolatile memories with flash erase capability.

Another object of this invention is to provide in a solid state file apparatus a means for recovering control information for erase counts of clusters or the like when it is lost by a system failure such as an accidental power failure.

Still another object of this invention is to provide a method which, when a bad sector is detected during operation of the SSF, correctly reflects it ill the control information holding area.

Yet another object of this invention is to provide a means for holding and recovering the control information which can cope with a situation when the control information holding area becomes unusable due to a sector failure such as a word line failure.

Yet another object of this invention is to provide a means for holding and recovering the control information which can cope with a block failure.

A nonvolatile memory with flash erase capability according to this invention comprises a plurality of sectors, each of said sectors holding attribute information for identification.

More specifically, the nonvolatile memory with flash erase capability according to this invention can be erased for each cluster as a unit, which comprises a plurality of sectors, each cluster being provided with a cluster information sector for storing its own control information, the cluster information sector for each cluster holding attribute information for identification, a sector to be written with user data holding attribute information for the data sector.

The cluster information sector is in principle placed at a predetermined location in a cluster to which it belongs. The data sector is placed in a data area in the cluster which is an area other than that predetermined location.

A data area of a given cluster may include a copy of management information on other clusters. Written in this cluster are the identifier for the other clusters and attribute information indicating them as copies of the cluster information sector.

The management information may include the erase counts of the cluster and a bad sector map.

The data area of a given cluster may include a sector for storing a location of a bad sector which is in that cluster or another cluster, and is not yet reflected in the bad sector map of a related cluster information sector. This sector is written with an identifier for the cluster including the bad sector and attribute information indicating it as a bad information sector.

The solid state file apparatus according to the present invention comprises a controller, and a nonvolatile memory with a flash erase capability connected to it. In each sector of the nonvolatile memory attribute information is set. The controller creates a cluster information copy sector in a data area upon cluster erasure, and reconstructs cluster management information from the cluster information copy sector upon cluster initialization to create a cluster information sector.

DESCRIPTION OF THE PREFERRED EMBODIMENTS

Figure 1:
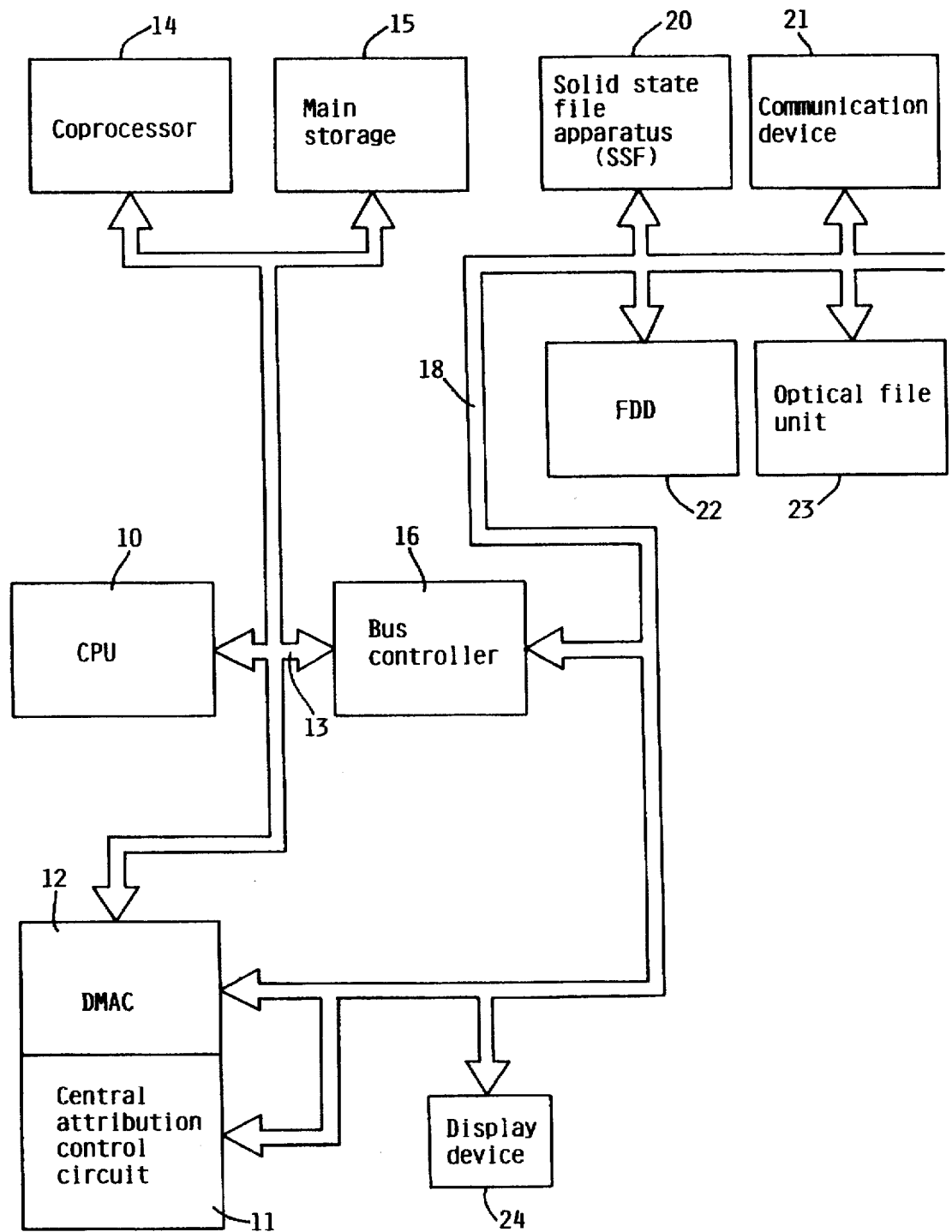
FIG. 1 shows a block diagram illustrating an example of a computer system which uses a flash memory according to the present invention as a solid state file apparatus.

FIG. 1 shows an example of a computer system in which a solid state file apparatus according to the present invention is incorporated. A CPU 10 communicates, through a system bus 13, with a main storage 15, a bus controller 16, and an optional math coprocessor 14. Communications between the CPU 10 and peripheral equipment are performed through the bus controller 16. To this end, the bus controller 16 is connected, through a family bus 18, to the peripheral equipment. A solid state file apparatus (SSF) 20 made of the flash memory according to the present invention, a communication device 21, a floppy disk drive (FDD) 22, an optical file unit 23, and a display device 24 are connected to the family device 18 as the peripheral equipment. Of course, other peripheral equipment may also be connected. An example of such a computer system is the IBM PS/2 (Registered trademarks of International Business Machines Corporation) personal computer system.

A direct memory access controller (DMAC) 12 is provided to enable memory access by all or some selected peripheral equipment. To this end, at least a portion of the family bus 18 is branched to the DMAC 12. Each piece of peripheral equipment which is allowed direct memory access DMA is provided with an arbitration circuit, though not shown in the drawing, and is assigned an arbitration level (priority). In association with the DMAC 12, a central arbitration control circuit 11 is provided which arbitrates among a plurality of peripheral equipment simultaneously requesting DMA and informs the DMAC 12 which peripheral equipment is granted DMA. Details of DMA control by the DMAC 12 and the central arbitration control circuit 11 are described in U.S. Pat. No. 4,901,234.

The CPU 10 uses the SSF 20 as a hard disk drive. Therefore, when the SSF 20 is accessed, a relative block address (RBA) comprising a head number, a cylinder number, and sector number, is sent to the SSF 20. The SSF 20 performs dynamic sector allocation. Therefore, the relationship between the RBA provided by the CPU 10 and an address (physical address) of a block of the SSF 20, which is actually accessed, is not fixed and varies each time writing is performed. Then, an address translation table is provided for indicating the relationship. That is, the RBA from the CPU 10 is a logical address. A corresponding physical address is written in the address translation table at an entry pointed by a logical address.

Figure 2:
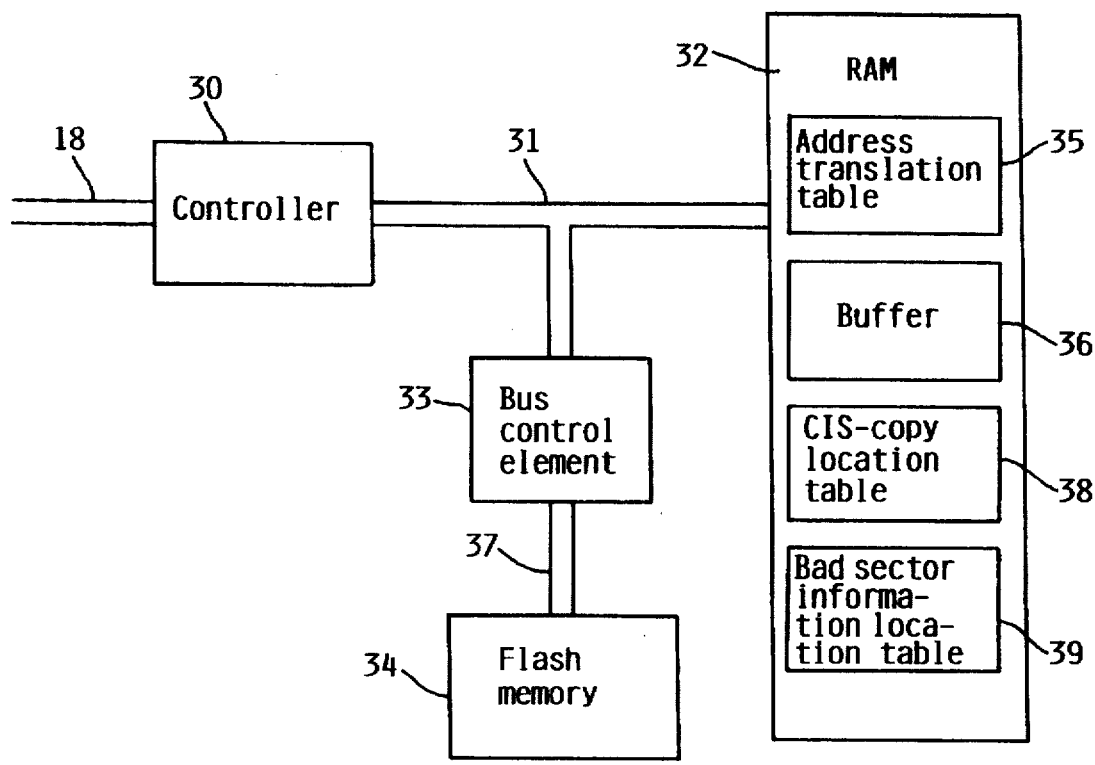
FIG. 2 shows a block diagram illustrating a schematic configuration of the solid state file apparatus shown in FIG. 1.

FIG. 2 shows a schematic configuration of the SSF 20. The SSF 20 comprises a controller 30 connected to the family bus 18, and an internal bus 31 comprised of a random access memory (RAM) 32, a bus control element 33, and a flash memory 34. Although not shown, the controller 30 includes a microprocessor and a ROM storing a program controlling it. The functions such as erasure, which are explained by referring flowcharts in FIG. 7 and thereafter, are implemented by executing the program in the ROM with the microprocessor.

The RAM 32 includes an area 35 for storing the address translation table, and a buffer area 36. In addition, the RAM 32 includes a table 38 for storing the location of a cluster information copy sector (hereinafter called the "CIS-copy location table"), and a table 39 for storing the location of a bad information sector (hereinafter called the "bad sector information location table"), both of which are described later. The bus control element 33 has the well-known receiver/driver configuration for interconnecting the internal bus 31 and a memory bus 37 connected to the flash memory 34.

Two embodiments with different configurations of sectors and clusters will be described in the following. In both of them, it is assumed that the sector size specified by the CPU 10 is 512 bytes, while the size of a physical sector, which is the minimum access unit of the CPU 10 to the SSF 20, is 512 bytes+α. In the first embodiment, sectors (physical sector) and clusters of the SSF 20 are managed as follows.

A logical set is created for which actual erasure is performed, and which is called a cluster. The cluster consists of one or more blocks, each of which is a physical erase unit. In this embodiment, eight sectors constitute one block, and eight blocks constitute one cluster. The relationship between the block and the cluster is established by making the upper address of the block an identifier for a cluster, or by creating a table.

In this embodiment, each of the physical sectors has the following attribute, and is identified by an attribute flag.

Figure 3:
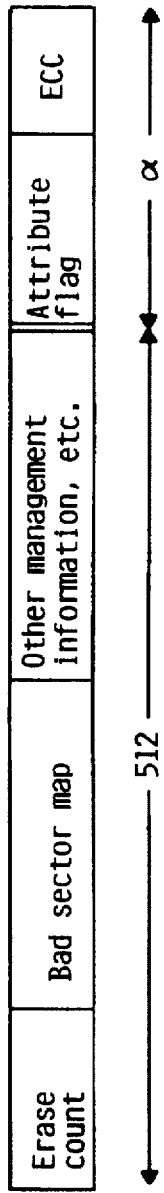
FIG. 3 shows a format of a cluster information sector in the flash memory of the first embodiment.

First, a sector positioned at the top physical address of each cluster is assigned to the cluster information sector (CIS) to store management information inherent to the cluster such as the cluster erase counts and the bad sector map in the cluster (see FIG. 3). In addition, a redundancy area (α bytes) includes an area in which an attribute flag is written and to which a "cluster information" flag indicating it as the cluster information sector is set. A parity code or the like is added to each of these information units enabling it to detect occurrence of an error.

The parity for each information unit is preferably a code allowing error correction. Here, a simple even-odd parity or CRC parity is sufficient. ECC parity is calculated for all the management information including all of these parities (including the attribute flag), and the result is written in the redundancy area in the cluster information sector.

U.S. Ser. No. 08/200,343, filed on Feb. 23, 1994 and corresponding to Japanese Pat. Appln. No. 5-35228 discloses an invention wherein a sequence number is previously provided for each cluster in such a manner that no two clusters have the same sequence number, when erasing and then initializing a given cluster, a value larger than the current maximum sequence number is written into the given cluster as a new sequence number. When clusters are managed by using such sequence numbers, a sequence number is written in the cluster information sector as management information. The cluster management information does not occupy the entire area of 512 bytes.

The top sector of a cluster is a vital sector in which the cluster management information is placed. However, it may suffer from a failure such as word line failure as in the other sectors. If the top sector is bad, it is arranged so as to use as the cluster information sector a sector preceding other sectors with any other attributes.

Figure 4:
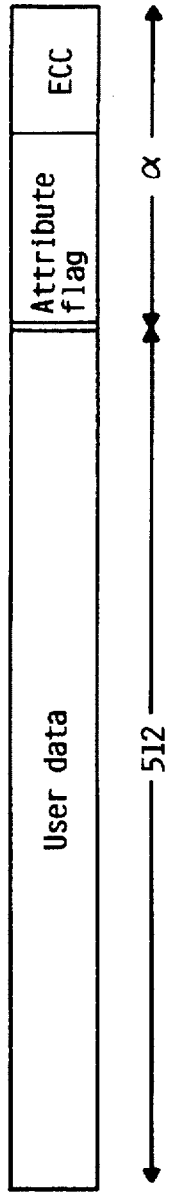
FIG. 4 shows a format of a data sector in the flash memory.

Because sectors other than the top sector of a cluster are areas in which user data is written, they are called user areas. FIG. 4 shows a format of a sector holding user data for each cluster (hereinafter called the "data sector"). As shown in the figure, the data sector includes areas for holding an attribute flag and an error correction code (ECC) in addition to the data area of 512 bytes for holding user data. Set in the attribute flag is a "data" flag indicating it to be a data sector. In this embodiment, dynamic sector allocation is performed so that a reverse pointer pointing to an entry of the address translation table is written as part of the attribute flag.

Figure 5:
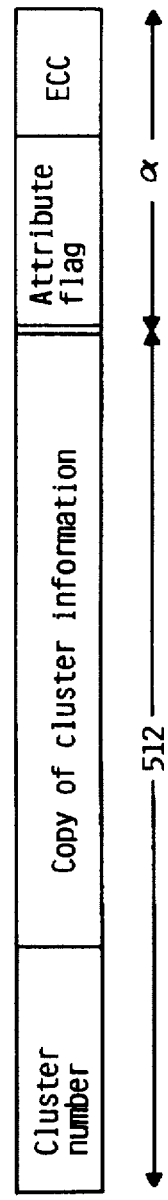
FIG. 5 shows a format of a cluster information copy sector in the flash memory.

The data area may include sectors of a kind other than the data sector. FIG. 5 shows a format of a sector for holding a copy of a cluster information sector (hereinafter called the "cluster information copy sector" or "CIS copy sector"). This sector is one for holding a copy of management information for a cluster other than the cluster to which it belongs. As shown in the figure, a cluster number and a copy of management information for the cluster with such number are written in the 512-byte data area, and a "cluster information copy" attribute flag indicating a cluster information sector and an ECC are written in the α-byte redundancy area.

Figure 6:
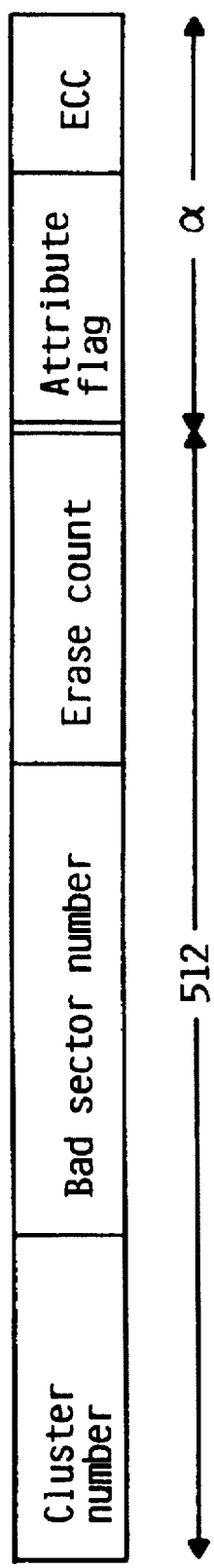
FIG. 6 shows a format of a bad sector information sector in the flash memory.

FIG. 6 shows a format of a bad information sector. This sector is one for holding numbers of bad data sectors found in a cluster to which it belongs and other sectors. As shown in the figure, cluster numbers, bad sector numbers in the cluster with that number, and erase counts at the moment when a bad sector is detected are written in the 512-byte data sector, and a "bad sector information" attribute flag and an ECC are written into the α-byte redundancy area.

It should be noted that the formats shown in FIGS. 3–6 are models. For example, the attribute flag may be positioned in an area which is first accessed in the entire 512+α bytes (top of a word line).

Figure 7:
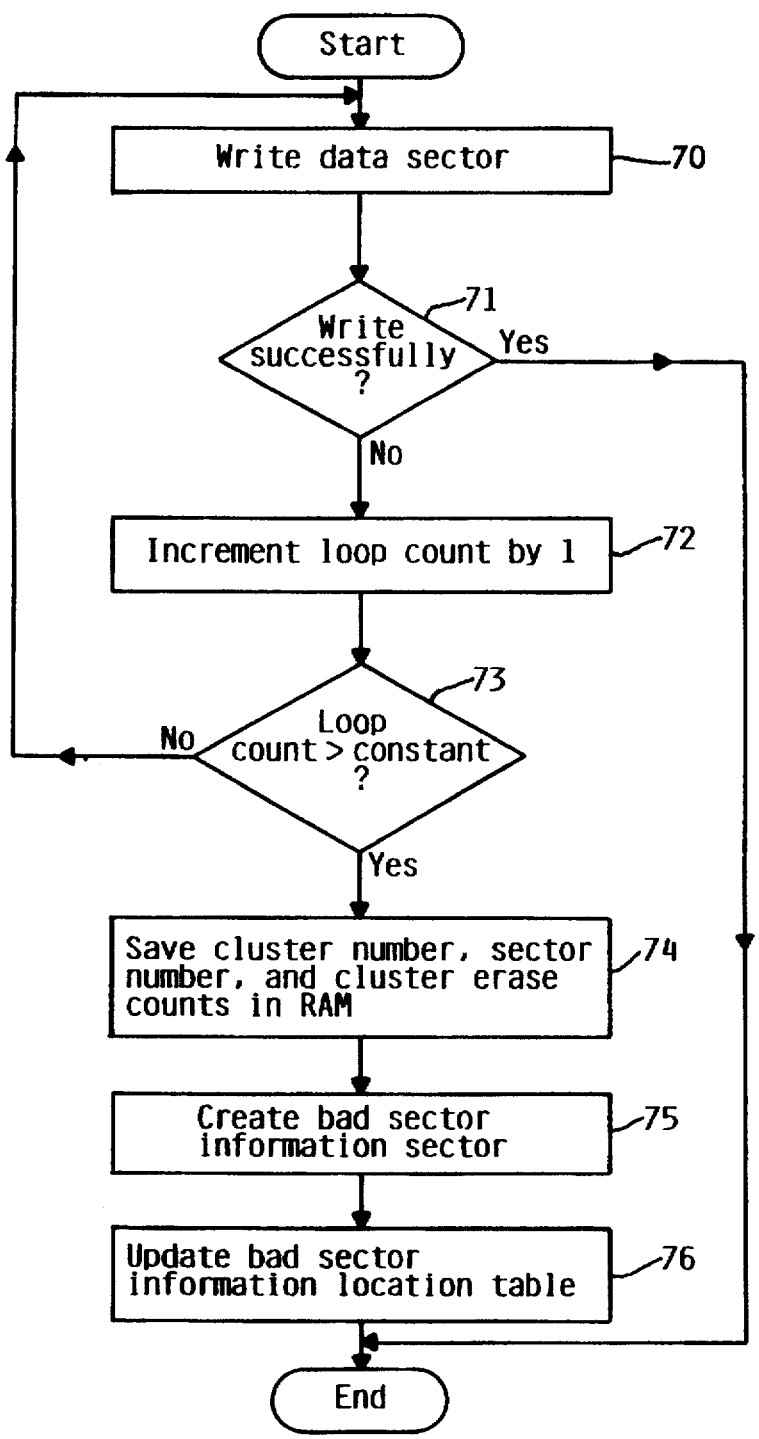
FIG. 7 shows a flowchart illustrating the operation of the SSF when a bad sector is detected.

Now, the operation of the SSF will be explained by referring to FIG. 7 when a bad data sector is found as a result of verification accompanying writing into a sector.

If a verification error occurs even after writing in a data area several times, the controller temporarily saves the cluster number, the erase count, and the sector number of the cluster to which that sector belongs in a RAM (step 74). These information units are then written in a sector to be written next in the cluster in which user data is being written to create a bad information sector with an attribute flag for "bad sector information" (step 75). Thereafter, the location of the bad information sector (cluster number and sector number) is registered in a bad sector information location table (step 76). The bad sector information location table records the relationship between the cluster number in the bad information sector and the location of that sector. For example, registered in an entry determined by the cluster number is the location of the bad information sector including that number.

As described, a bad information sector is created in the flash memory when a bad sector is found so that the bad sector information can be maintained even if power failure should occur in a period before the related bad sector map is updated.

The operation of the SSF will be explained by referring to FIGS. 8–11 in erasing and initializing a cluster (an erase program and an initialize program executed by the controller).

Figure 8:
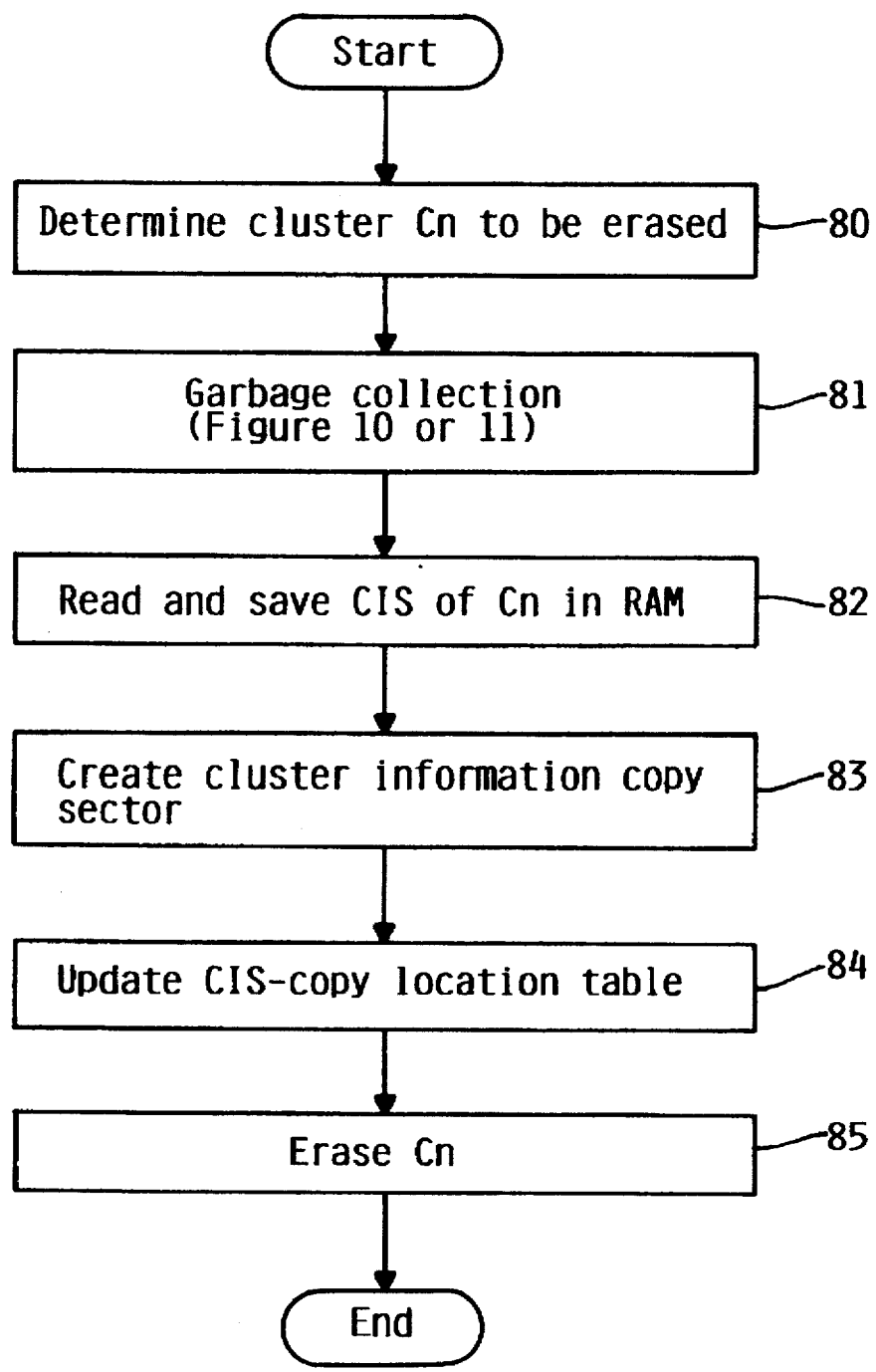
FIG. 8 shows a flowchart illustrating the operation of the SSF when a sector is erased.

FIG. 8 shows a flowchart for erasure of a cluster. When a cluster Cn satisfies a condition such that the number of its valid sectors is below a predetermined number, the controller determines that cluster is to be erased (step 80). Then, it performs garbage collection for saving, in another cluster, valid data in that cluster, which is described later (step 81).

After the garbage collection, the controller reads the CIS of the cluster Cn and saves it in the RAM (step 82). Then, the cluster number of Cn and the management information just read are written into a sector to be written next in the cluster in which the user data is being written, and a "cluster information copy" flag and a calculated ECC are written in it so as to create a cluster information copy sector (step 83). After the location of the created CIS copy sector is registered in the CIS-copy location table, the controller erases the cluster Cn (steps 84 and 85). The CIS-copy location table records the relationship between the cluster number included in the copy sector and the location of that sector. For example, registered in an entry determined by a cluster number is the location of a CIS copy sector including that number.

Thus, the CIS copy sector is created in the flash memory before erasing a cluster so that the cluster management information is not lost even if power failure should occur during erasure.

Figure 9:
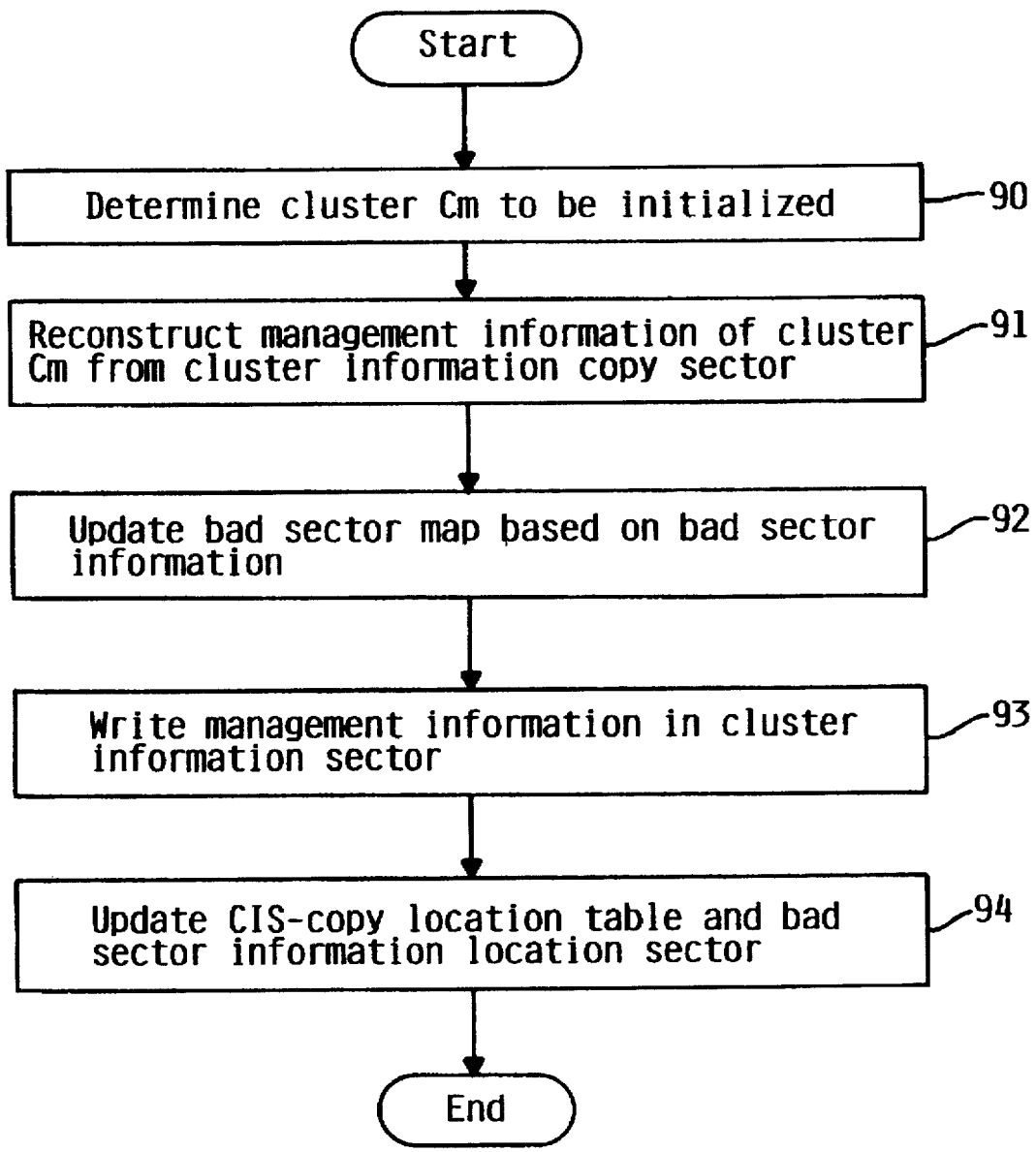
FIG. 9 shows a flowchart illustrating the operation of the SSF when a sector is initialized.

FIG. 9 shows a flowchart for initialization of a cluster. The initialization herein means that a cluster information sector is created in an erased cluster so that it is put into a state allowing the writing of user data. When a condition is reached such that clusters consisting of blank sectors only are exhausted, the controller selects a cluster Cm to be initialized from one or more erased clusters by taking the erase count or the like into consideration (step 90). Then, it reads the CIS copy sector on the cluster Cm indicated in the CIS-copy location table to reconstruct the management information of the cluster Cm. The erase count is incremented at this time (step 91). Then, it reads the bad information sectors in the cluster Cm indicated in the bad sector information location table, and updates the bad sector map based on the information on the bad information sectors (step 92). Thereafter, a cluster information sector is created in the top sector of the cluster Cm. If writing in the sector should fail, or if the management information in the CIS copy sector (for example, the top bit of the bad sector map) indicates that the top sector is bad, the cluster information sector is created at the second location or later which is not bad (step 93). The location information on the CIS copy sector reflected in the cluster information sector is cleared from the CIS-copy location table, and the location information on the bad sector information location table is cleared from the bad sector information location table (step 94).

Figure 10:
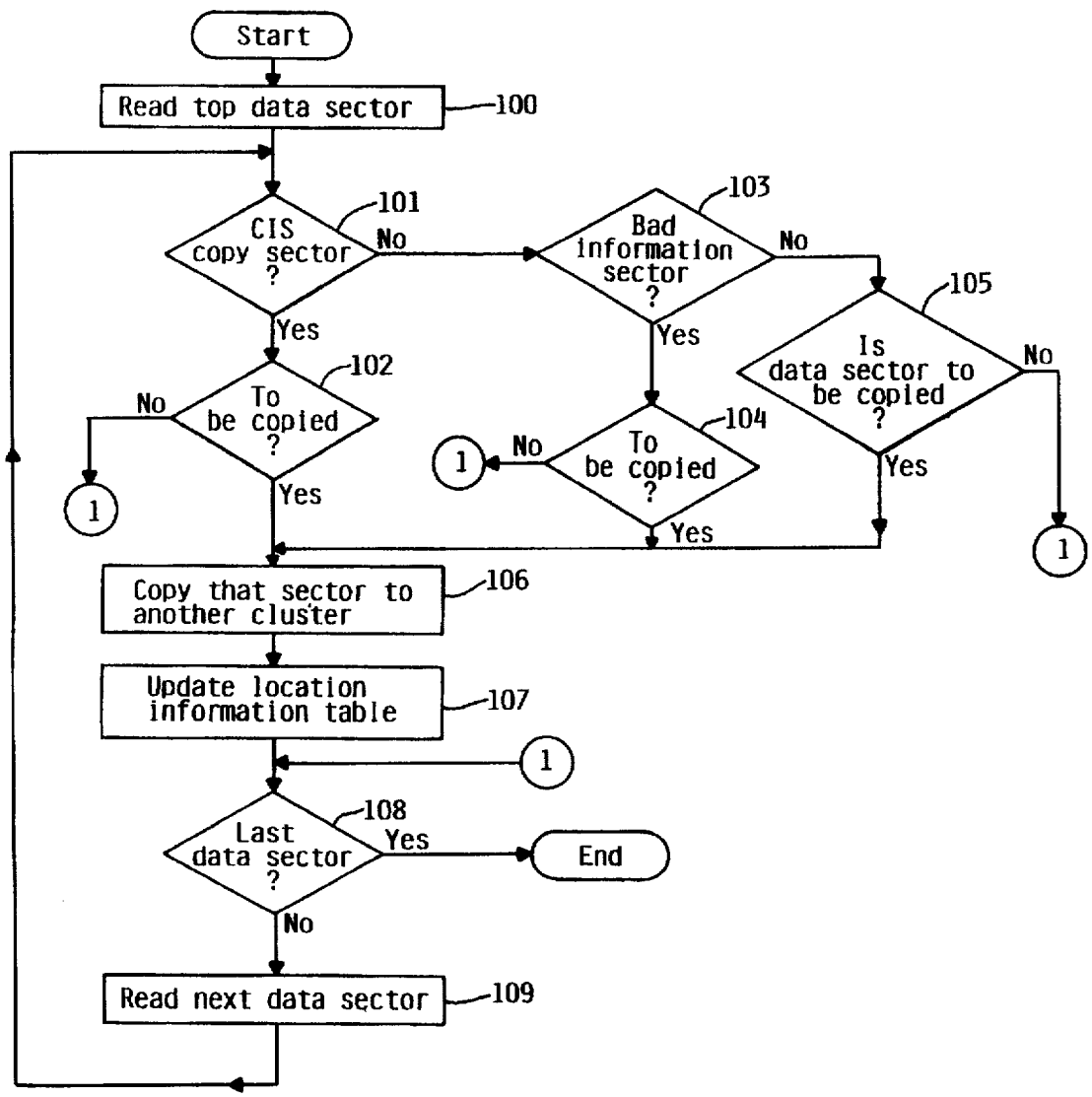
FIG. 10 shows a flowchart illustrating an example of garbage collection.

Now, the garbage collection is described in detail for two cases. FIG. 10 shows a flowchart for a case where a data area is read from top to end. If it is determined to be a CIS copy sector from the attribute flag of the read sector, the controller determines whether or not it holds valid information, and therefore, has to be copied to another sector (step 102). More specifically, the erase count Ex of a cluster Cx held by the CIS copy sector is compared with an erase count Ea actually written in the CIS of cluster Cx. If Ex equals Ea, the CIS copy sector is considered to be valid data. Also, if the cluster Cx is in an erased state, it is considered to be valid. Otherwise, it is handled as invalid data. Thus, it prevents the CIS copy sector from being erased as invalid data. If the cluster is in an erased state, judgment is made in step 142 in FIG. 14, which will be described later.

Also, if the read sector is found to be a bad information sector, a similar judgment is made (step 104). More specifically, the erase count held by the bad information sector is compared with that written in the actual CIS. If both are equal, the bad sector information is considered to be valid. Otherwise, it is determined that the bad sector information has been reflected in the CIS, and is treated as invalid data. Thus, it prevents the bad information sector from being erased prior to update of the bad sector map.

Also, if the read sector is a data sector, it is determined whether or not it should be copied (step 105). More specifically, the address translation table is referenced by the reverse pointer to find a physical address written in it, which is then compared with its physical address. If both match, then it is valid data. Thus, the sector is copied in a location where the user data should be written in the cluster in which the user data is being written (step 106). Then, if the read sector is a valid CIS copy sector, the CIS-copy location table is updated, and if it is a valid bad information sector, the bad sector information location table is updated (step 107).

Figure 11:
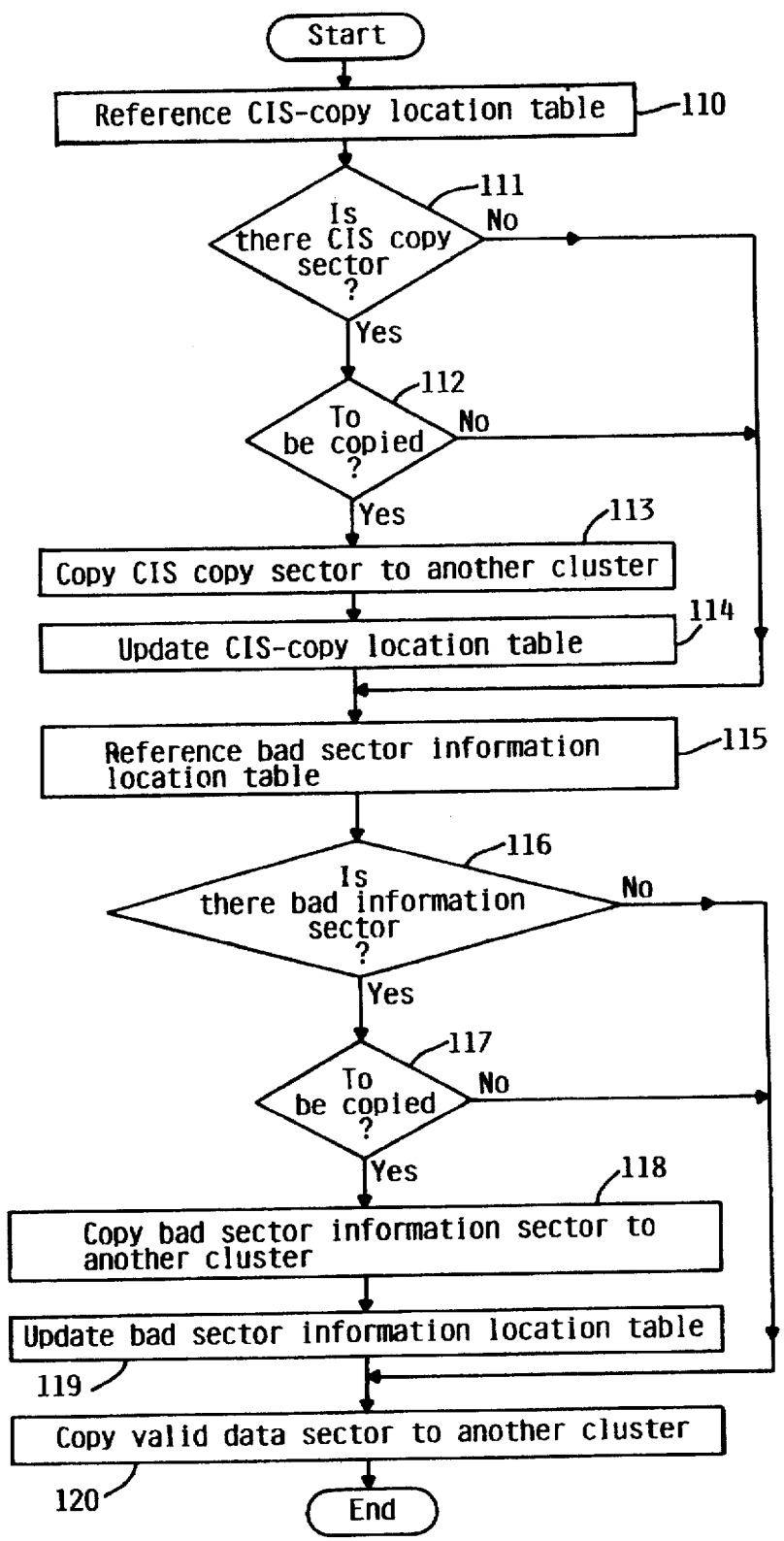
FIG. 11 shows a flowchart illustrating another example of garbage collection.

FIG. 11 shows a flowchart for garbage collection which, when the validity of each data sector has been previously recorded, is performed by utilizing such record, the CIS-copy location table and the bad sector information location table. The validity is determined in a manner similar to step 102 in FIG. 10 if the CIS copy sector is in a cluster to be erased, and in a manner similar to step 104 if there is a bad information sector (step 112 and 117).

Figure 12:
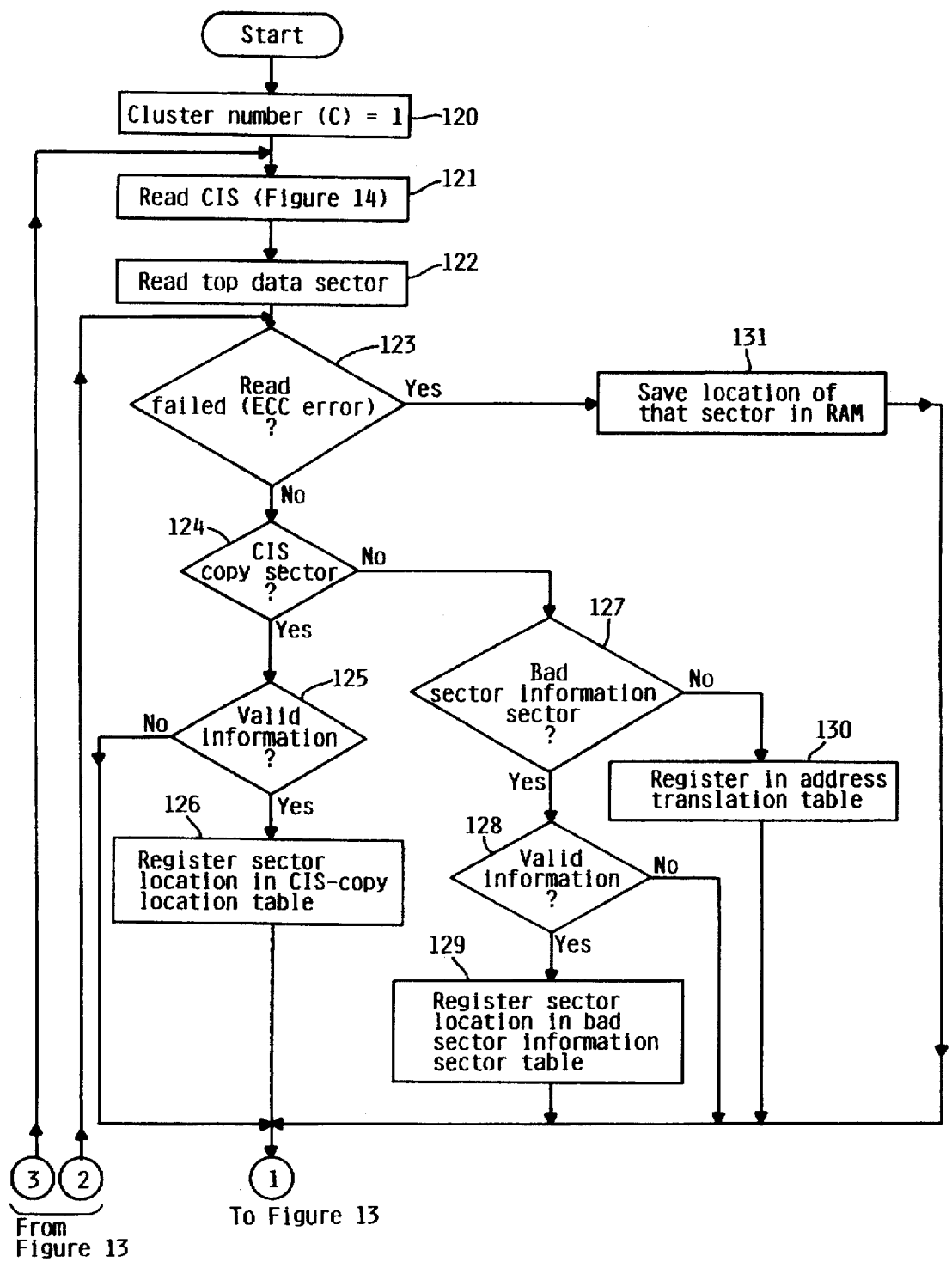
FIG. 12 shows a flowchart illustrating the operation of the SSF when an address translation table is reconstructed.
Figure 13:
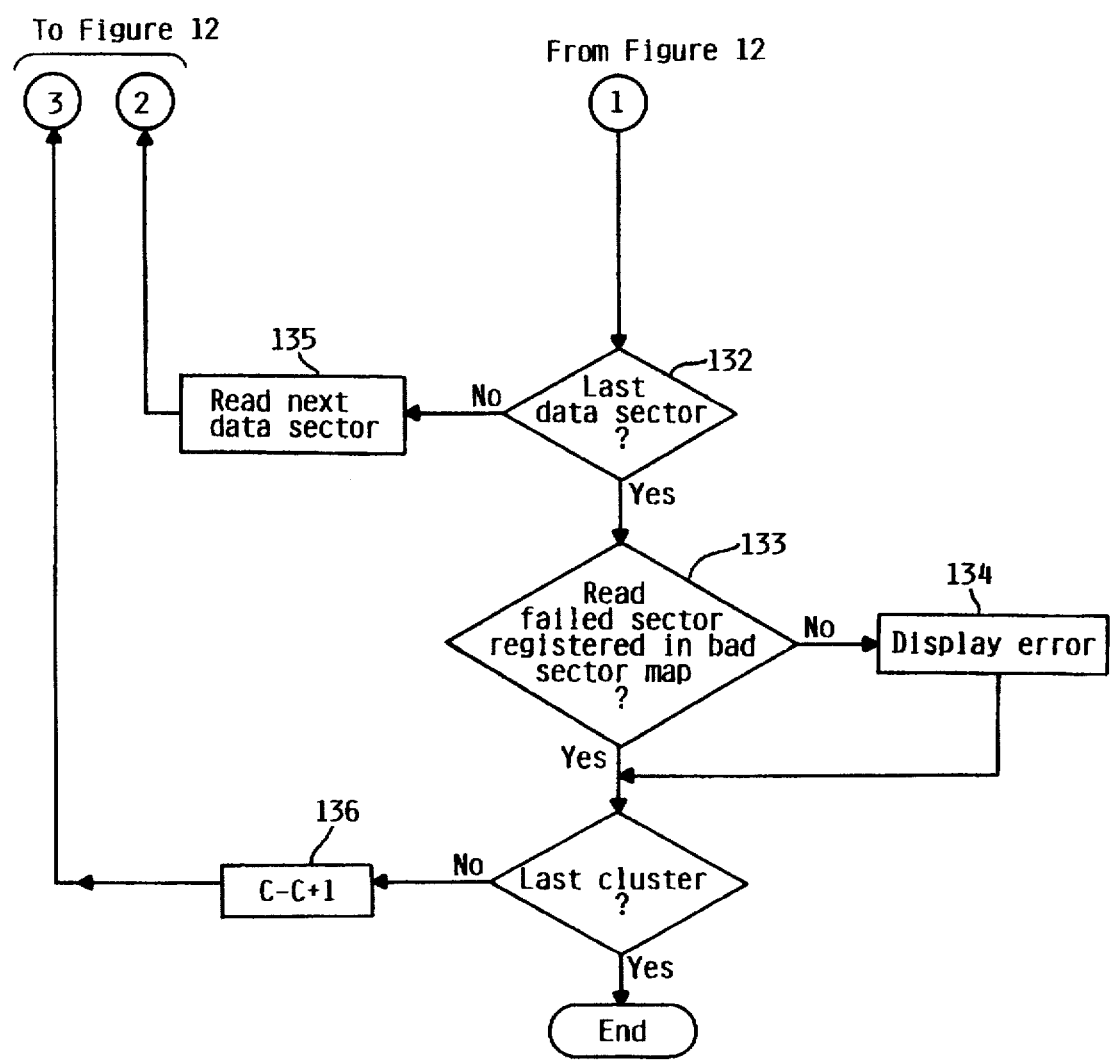
FIG. 13 shows a flowchart illustrating the operation of the SSF when an address translation table is reconstructed.

The operation of the SSF will be explained by referring to FIGS. 12 and 13 in reconstructing the address translation table (an address translation table reconstruction program executed by the controller). The address translation table is essential in executing the dynamic sector allocation, but, because it is created on the RAM, is lost when the power is turned off. Therefore, when starting the system, the address translation table is reconstructed by reading all sectors in all clusters.

After successful reading of the CIS at the top of a given cluster, the controller sequentially reads the sectors in a data area from top to end (steps 121, 122, 132 and 135). For a sector that failed in reading, its location is temporarily saved in the RAM (step 131). For a sector that was successful in reading, its attribute flag is checked. If it is a CIS copy sector or a bad information sector, its validity is determined as in steps 102 and 104 (steps 125 and 128). If the read sector is a valid CIS copy sector, the CIS-copy location table is updated, and, if it is a valid bad information sector, the bad sector information location table is updated (steps 126 and 129). If it is a data sector, its physical address is registered in an entry of the address translation table pointed to by the reverse pointer (step 130).

After completion of reading of the data area, the location of the read failed sector saved in step 131 is compared with the location registered in the bad sector map in the CIS (step 133). If the location of the read failed sector is not yet registered, an error message is displayed on, for example, the display device 24 (FIG. 1) (step 134).

As described earlier, the SSF reads the cluster information sector when erasing a cluster, or when reconstructing the address translation table. However, if erasure or initialization has ended in failure due to system failure or the like, the content of cluster management information is broken, and an ECC uncorrectable error is generated. That is, reading of the top sector of the cluster has ended in failure. Also, in this embodiment, when the top sector of the cluster is bad, the cluster information sector is the next sector, or the sector at the top of data area. In this case also, the reading of the top sector has ended in failure.

Figure 14:
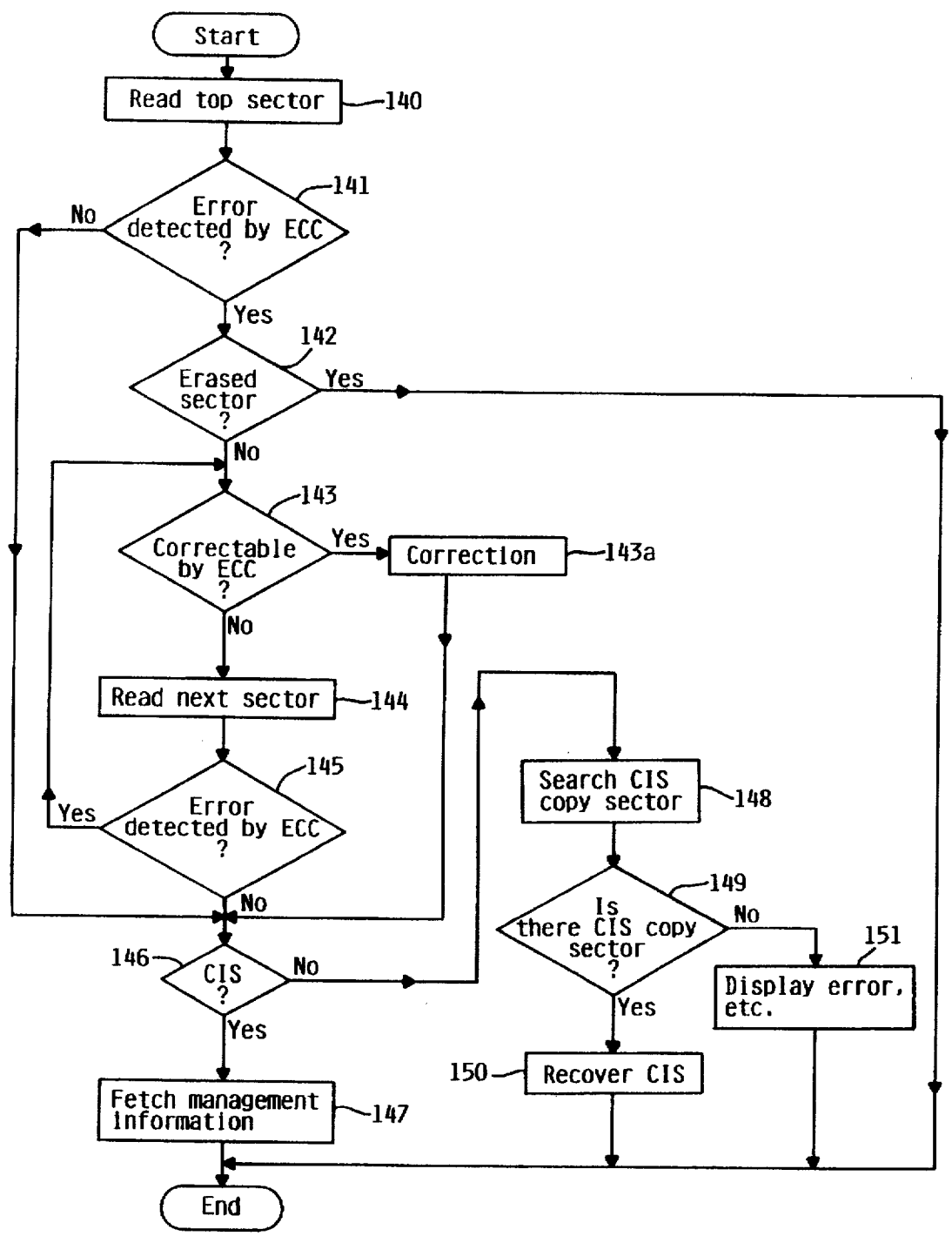
FIG. 14 shows a flowchart illustrating reading of the top sector of a cluster of the SSF in the first embodiment and operations related thereto.

FIG. 14 shows a flowchart of an operation for acquiring the cluster management information when reading the top sector, or when failing such reading in erasing a cluster or in reconstructing the address translation table. If no uncorrectable error is detected when reading the top sector, step 146 checks the attribute flag. If it is confirmed to be "cluster information," the management information is saved in the RAM by type (step 147).

Situations where an error should be detected in step 141 include such cases where the cluster has been erased. Then, step 142 determines whether or not the cluster has been erased. More specifically, the bit pattern of the top sector is compared with a bit pattern specific for an erased one. If both match, it means the cluster has been erased, and the process terminates immediately.

In this embodiment, if the top sector is bad, a cluster information sector proceeds all other sectors with any attribute in the data area. Then, even when step 143 determines an error to be uncorrectable, the controller repeats the reading of sectors and detection of an error until it finds a sector not causing an uncorrectable error (steps 144, 145, and 143).

If a cluster properly read as the result of the decision in step 146 is not a cluster information sector, it means that the cluster information sector is not at a location where it should be originally placed. Such a situation is generated when system failure such as power off occurs during erasing a block including the cluster information sector or during initializing a cluster, or when the cluster information sector becomes unreadable. Then, in step 148, a cluster information copy sector saving the cluster management information is searched by scanning all sectors in all clusters. Once it is found, erasure is performed again, and initialization is performed by fetching the management information from the cluster information copy sector, copying it to the top sector of the cluster, and creating a cluster information sector. If writing in the top sector should end in failure, the next sector is made the cluster information sector (step 150). If there is no CIS copy sector, it means that a fatal error is caused. Then, a message indicating that fact is displayed for the user, and an instruction from the user is awaited (step 151).

Now, the management of sectors and clusters in the second embodiment will be explained.

Figure 15:
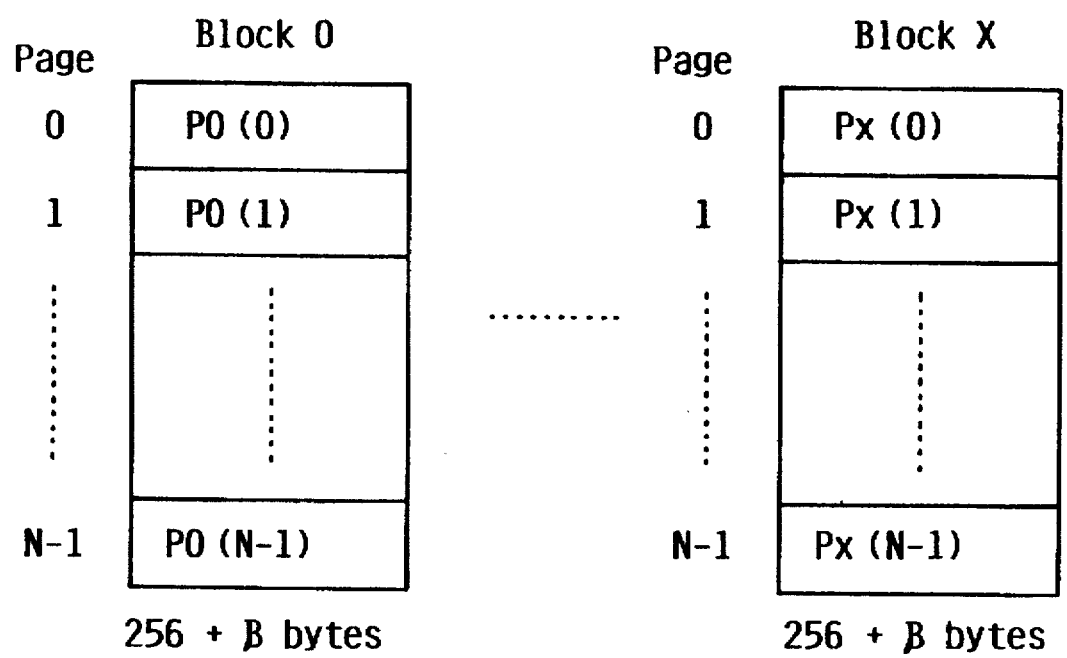
FIG. 15 shows a relationship between a block and pages in the second embodiment.

As shown in FIG. 15, a block, which is a physical erase unit, is divided into N pages. The size of one page is 256+bytes (256=one half sector size, and being a redundancy area of several bytes used by the system).

Figure 16:
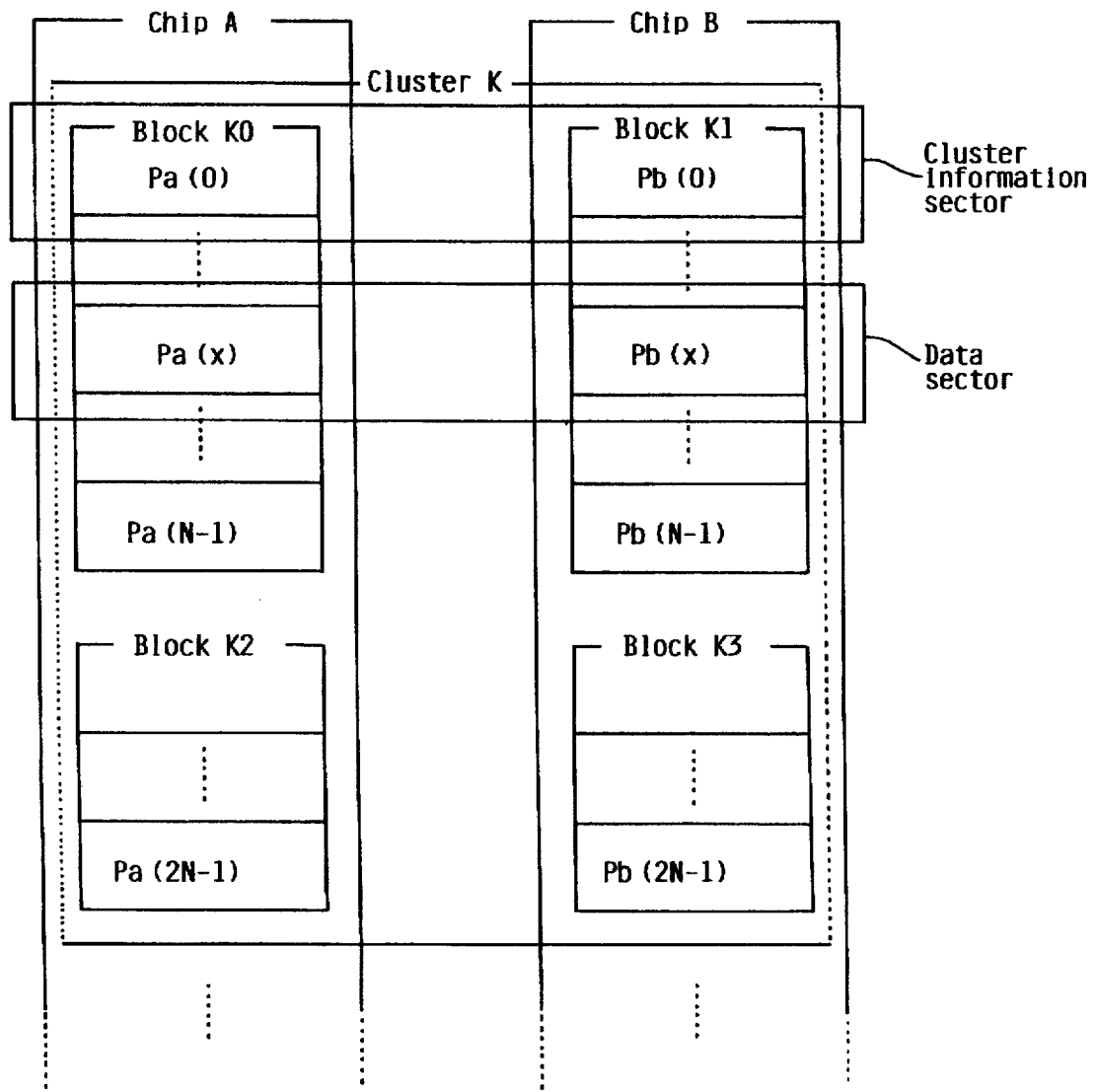
FIG. 16 shows a relationship between clusters, blocks, sectors and pages in the second embodiment.

How to constitute a page does not generally depend on the physical requirements of a chip being used. For example, in a case of a chip in which access is made on a byte-by-byte basis, it is sufficient to simply handle 256+bytes as a logical block. It may also be possible to use a dedicated chip, the physical page length (word line length) of which is 256+ bytes. FIGS. 15 and 16 show a case where the latter chip is used.

An even number of blocks constitutes a set to form a cluster which is a logical erase unit. The controller performs erasure on a cluster-by-cluster basis. As shown in FIG. 16, these blocks are divided into groups of each half, each of which is allocated to a different chip.

Allocation of blocks forming a cluster to a chip is generally performed in any desired method. Herein, block allocation as shown in FIG. 16 is employed to simultaneously activate two chips for the purpose of improving the data transfer rate. That is, one cluster is formed by four blocks every two of which are allocated to different chips. This allows it to double the bus width between the controller and the flash memory. If double bus width is further required, it is sufficient to divide the blocks forming a cluster into groups of ¼, and allocate each of them to four different chips. In this case, the length of one page is made 128+.

One physical sector is always assigned to a plurality of blocks (in this case, two). Also, an ECC parity is appended to an entire sector.

The length of a physical sector is 512+α bytes, and two pages are necessary to hold it (hereinafter, two pages for holding one physical sector being called a "page pair"). In this embodiment, it is arranged so that each page is in a different chip and therefore in a different block by allocating each pair in Pa (x) and Pb (x) as shown in FIG. 16.

Figure 17:
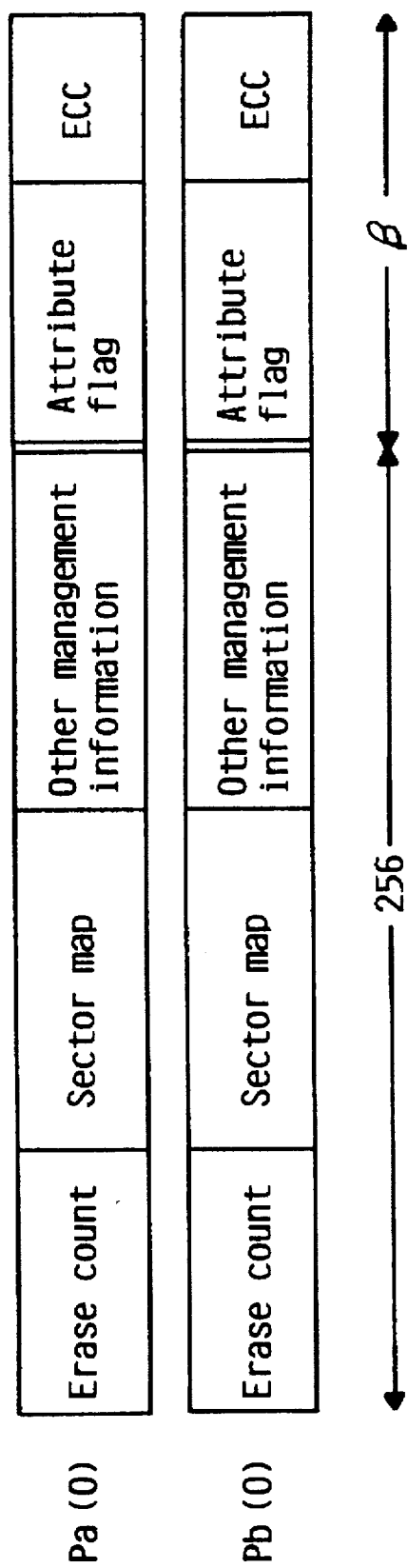
FIG. 17 shows a format of a cluster information sector in a flash memory in the second embodiment.

A cluster information sector is formed in the top sector in each cluster (Pa (0) and Pb (0) in FIG. 16) in which, as in the first embodiment, management information inherent to each cluster such as the cluster erase count and the bad sector map in the cluster is stored by appending parity codes. FIG. 17 shows the format of the cluster information sector of this embodiment. It differs from that of the first embodiment in that the cluster management information is written in each page of the page pair in duplicate.

An ECC parity is calculated for the entire duplicated management information portion in the page pair (including the "cluster information" attribute flag), and written in the redundancy area in the page pair (α=2 bytes). One half of the bits in the calculated ECC parity are stored in Pa (0), and the other in Pb (0). Therefore, the ECC portions in Pa (0) and Pb (0) are different from each other. Except for the ECC portion, both pages hold exactly same content.

Because, as described, the cluster management information is held in two pages in duplicate, it is never lost all at once due to a word line failure. In addition, because these two pages are allocated to different blocks, the cluster management information is never lost all at once due to a block failure. In FIG. 16, page pairs for sectors other than the cluster information sectors are allocated to two blocks. Generally, endurance against block failure can be sufficiently enhanced even if the page pair constituting the cluster information sector is allocated in different blocks, while page pairs for other sectors are allocated in a same block.

Figure 18:
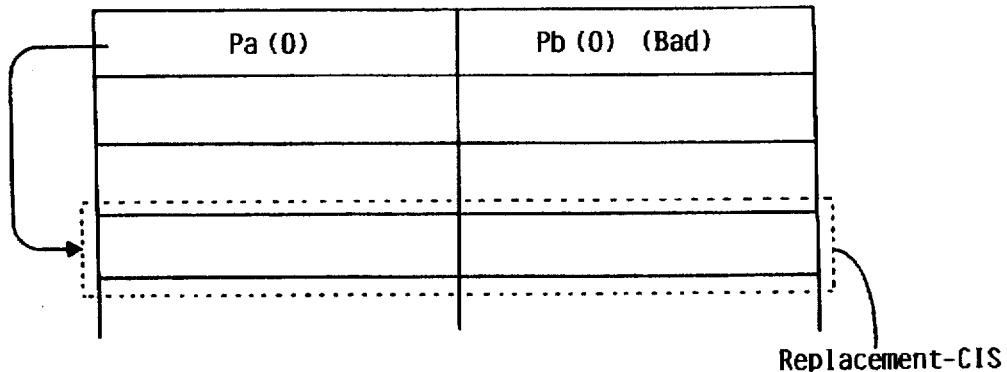
FIG. 18 shows a relationship between a replacement-CIS pointer sector and a replacement-CIS.
Figure 19:
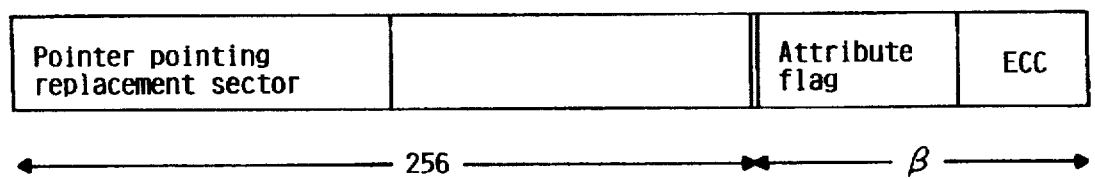
FIG. 19 shows a format of a replacement-CIS pointer sector.

While, in the first embodiment, a sector other than the cluster information sector is never positioned at the top of the cluster, a replacement-CIS pointer sector may be so positioned in this embodiment. As shown in FIG. 18, the replacement-CIS pointer sector is such a sector that, if one of the pages in the top sector of the cluster is bad, then the replacement-CIS pointer sector holds the address of a replacement-CIS in the other page. FIG. 19 shows a format for it. The address (pointer) of a replacement sector for storing the cluster management information is written in the top of one page, and an attribute indicating it as the replacement sector pointer and an ECC are written in the redundancy area of bytes.

Usually, the second sector in a cluster is selected as the replacement sector. However, if such sector has a bad sector map set with a "bad" flag, selection proceeds one after another for the replacement-CIS sector. A sector selected as the replacement sector has usually the same format as the ordinary cluster information sector. It has the same formats for the data sector, the cluster information copy sector, and the bad sector information sector as those shown in FIGS. 4 through 6.

In this embodiment, the operations of the SSF are the same as those in the first embodiment when a bad data sector is found, or when erasure, initialization, or creation of the address translation table is performed.

Figure 20:
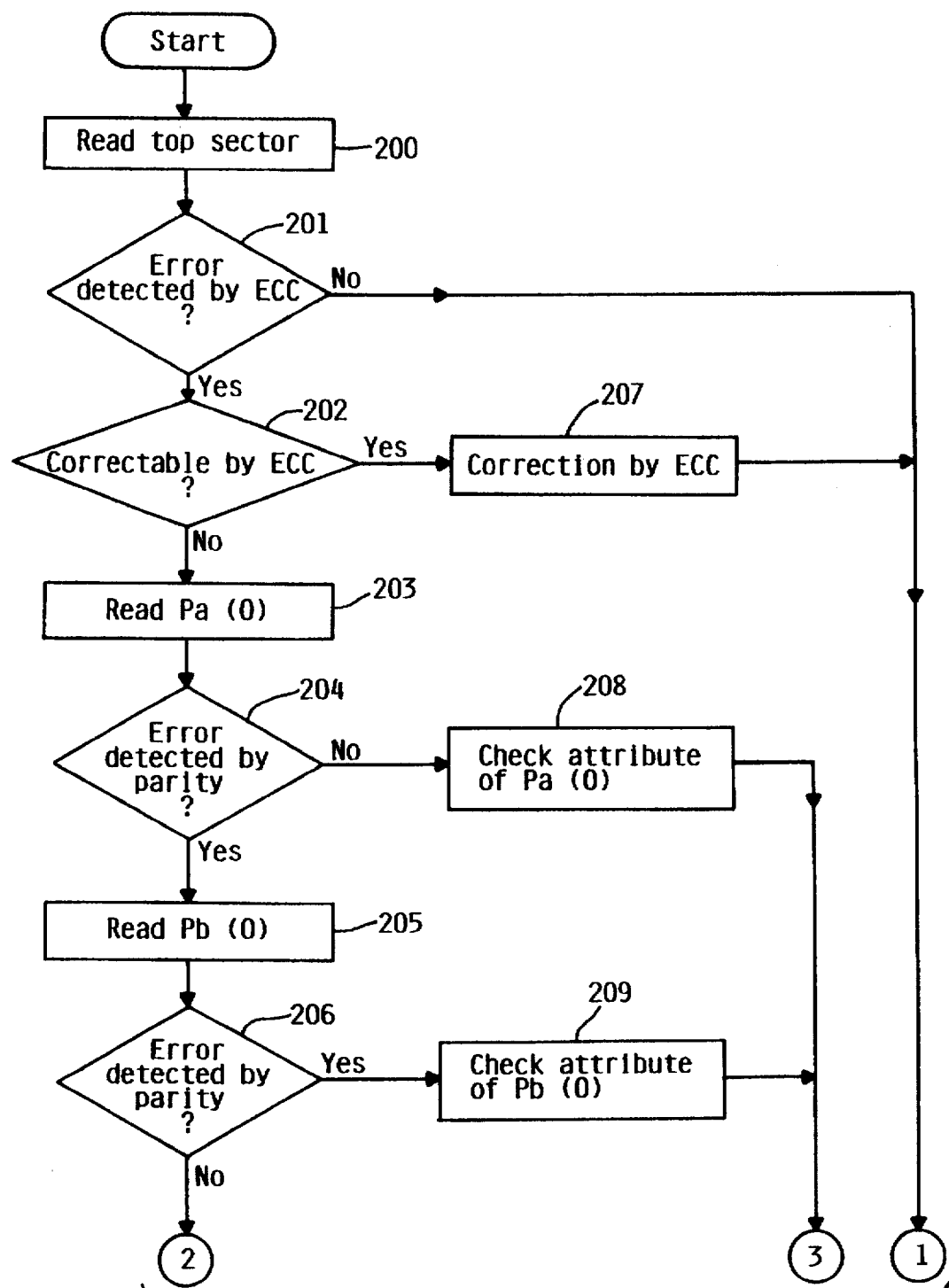
FIG. 20 shows a flowchart illustrating reading of the top sector of a cluster of the SSF in the second embodiment and operations related thereto.
Figure 21:
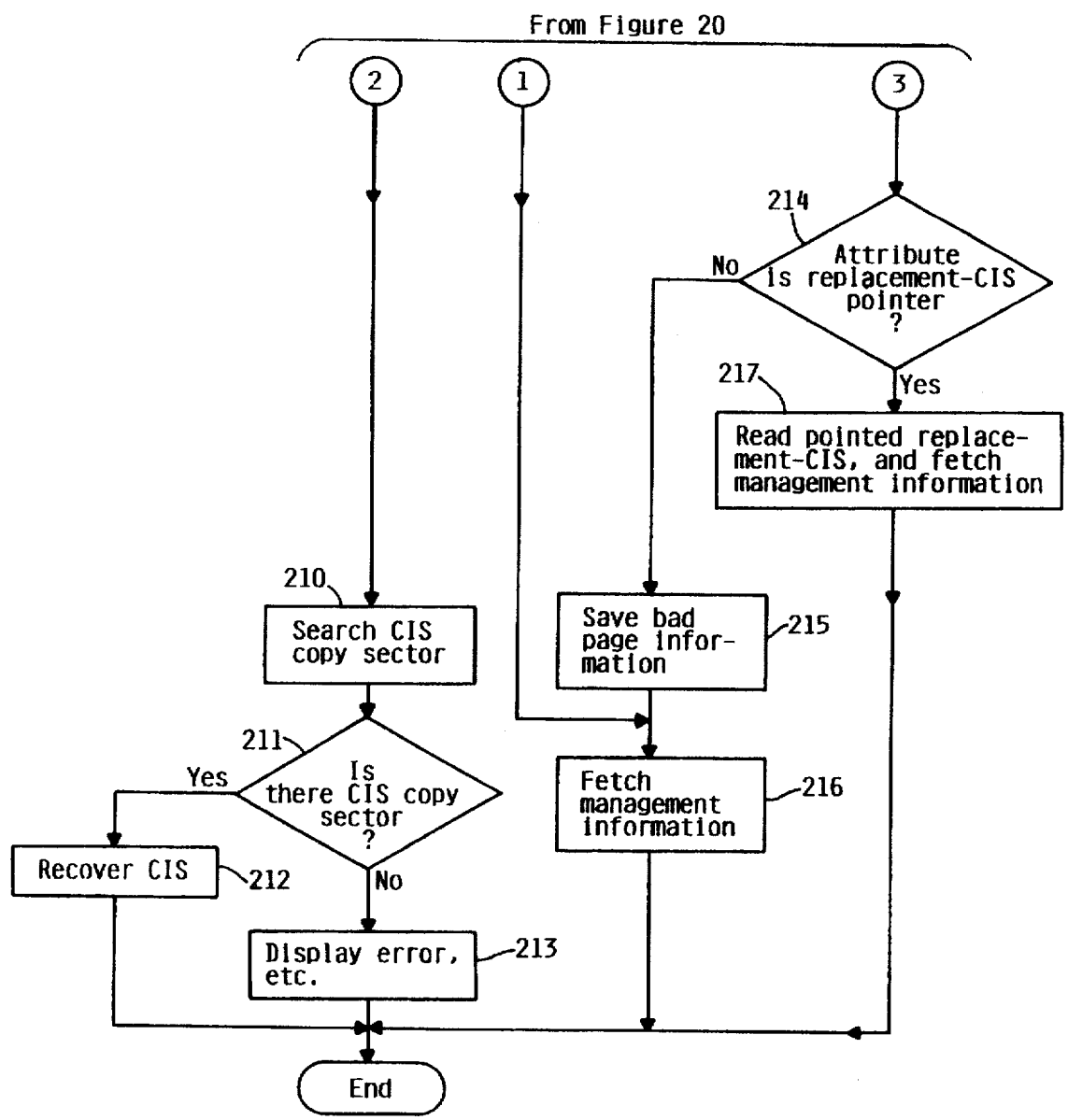
FIG. 21 shows a flowchart illustrating reading of the top sector of a cluster of the SSF in the second embodiment and operations related thereto.

However, because the cluster information is duplicated and the replacement sector pointer is provided, the operation differs from that of the first embodiment when the top sector of the cluster is read and when such reading fails. FIGS. 20 and 21 show the flowchart of the operation in this embodiment.

When no uncorrectable error is detected by reading the top sector, the process proceeds to step 216 where the management information is divided and stored in the RAM by type.

If an uncorrectable error is detected, the cluster information sector is separately read by page. First, the page Pa (0) is read and checked for the integrity of data by the parity codes for Pa (0) appended to various management information (step 204). If they are correct data, the process proceeds to step 208 where the attribute flag of Pa (0) is checked.

If the data read from Pa (0) is incorrect, the page Pb (0) is read and checked by the parity codes (step 206). If the data is correct, the process proceeds to step 209 where the attribute flag of Pb (0) is checked.

If the contents of both pages for the top sector are incorrect, a CIS copy sector is searched for. If it is found, the process proceeds to step 212 where the CIS is recovered as in step 149 in FIG. 14. If not, it proceeds to step 213 where processing, such as error display, is performed as in step 150 in FIG. 15.

If the checking of the attribute in the page Pa (0) or Pb (0) which is not bad in step 214 reveals that the page is one of the pages constituting the CIS, it means that neither a replacement-CIS sector or a replacement-CIS sector pointer has yet been created. Therefore, to create the replacement-CIS and the replacement-CIS pointer sector in subsequently initializing a cluster, which of the pages for the number and the top sector of the cluster that is bad is saved in the RAM (step 215). Then, in step 216, the management information contained in that page is divided and stored in the RAM by type.

It the attribute of Pa (0) or Pb (0) is a "replacement-CIS pointer," the process proceeds to step 217 where the replacement-CIS being pointed to is read and the management information is fetched.

Although, in practice, there is a step corresponding to step 142 in FIG. 14 between steps 201 and 202, for the convenience of description, it is omitted in FIG. 20.

Although two specific embodiments are described in the above, the scope of this invention is not limited to them. For example, in an SSF in which a sequence number is written in a cluster and rewritten at every erasure or initialization as disclosed in U.S. Ser. No. 08/200,343, filed on Feb. 23, 1994 and corresponding to Japanese Pat. Appln. No. 5-35228, it may be possible to compare the sequence number instead of the erase count in steps 112 and 117 in FIG. 11 or in steps 125 and 128 in FIG. 12.

As described in the above, according to the present invention, endurance against failure such as power failure can be improved for a solid state file apparatus using a nonvolatile memory with flash erase capability.

What is claimed is:

1. A nonvolatile memory with flash erase capability, comprising:

a plurality of clusters, each of said clusters having a plurality of sectors;

each of said clusters having a cluster information sector for storing management information relative to the respective one of said clusters, said cluster information sector holding attribute information for said cluster information sector;

each of said clusters having a data area including data sectors for storing user data, said data area being at a location other than said cluster information sector, each of said data sectors holding attribute information for said data sectors; and a cluster information copy sector in said data area in a first one of said clusters for storing a copy of said management information relative to a second one of said clusters, said cluster information copy sector holding an identifier of the second cluster and attribute information for said cluster information copy sector.

2. A nonvolatile memory with flash erase capability, comprising:

a plurality of clusters, each of said clusters having a plurality of sectors;

each of said clusters having a cluster information sector for storing management information relative to the respective one of said clusters, said cluster information sector holding a cluster erase count, a bad sector map and attribute information for said cluster information sector; and each of said clusters having a data area including data sectors for storing user data, said data area being at a location other than said cluster information sector, each of said data sectors holding attribute information for said data sectors.

3. The nonvolatile memory as claimed in claim 2, further comprising:

a bad information sector in said data area in a first one of said clusters for storing a location of a bad sector which is in the first cluster and not yet reflected in said bad sector map in said cluster information sector in the first cluster, said bad information sector holding an identifier of the first cluster and attribute information for said bad information sector.

4. The nonvolatile memory as claimed in claim 2, further comprising:

a bad information sector in said data area in a first one of said clusters for storing a location of a bad sector which is in a second one of said clusters and not yet reflected in said bad sector map in said cluster information sector in the second cluster, said bad information sector holding an identifier of the second cluster and attribute information for said bad information sector.

5. A nonvolatile memory with flash erase capability, comprising:

a plurality of clusters, each of said clusters having a plurality of sectors;

each of said clusters having a cluster information sector for storing management information relative to the respective one of said clusters, said cluster information sector holding attribute information for said cluster information sector;

each of said clusters having a data area including data sectors for storing user data, said data area being at a location other than said cluster information sector, each of said data sectors holding attribute information for said data sectors;

each of said clusters having a plurality of blocks, each of said blocks being a physical erase unit and including a plurality of pages;

a predetermined one of said pages of a first portion of said blocks included in a given one of said clusters being allocated to a first portion of said cluster information sector of the given cluster, a predetermined one of said pages of a second portion of said blocks included in the given cluster being allocated to a second portion of said cluster information sector of the given cluster; and said management information for the given cluster being written in duplicate in the first and second portions of said cluster information sector of the given cluster.

6. The nonvolatile memory as claimed in claim 5, wherein:

the first and second portions of said cluster information sector of the given cluster are assigned to different memory chips.

7. The nonvolatile memory as claimed in claim 6, wherein:

a replacement cluster information sector being written in said data area of the given cluster when one of the first and second portions of said cluster information sector of the given cluster is bad, said replacement cluster information sector holding attribute information for said cluster information sector; and the other of the first and second portions of said cluster information sector of the given cluster holding a pointer pointing to said replacement cluster information sector.

8. A method of controlling a solid state file apparatus having a controller and a nonvolatile memory with flash erase capability, said nonvolatile memory having a plurality of clusters, each of said clusters having a cluster information sector for storing management information relative to the respective one of said clusters, said cluster information sector holding attribute information for said cluster information sector, each of said clusters having a data area including data sectors for storing user data, said data area being at a location other than said cluster information sector, each of said data sectors holding attribute information for said data sectors, said method comprising the steps of:

reading said management information in said cluster information sector of a first one of said clusters prior to erasure of the first cluster;

writing, in a cluster information copy sector in said data area of a second one of said clusters other than the first cluster, an identifier of the first cluster and said management information in said cluster information sector of the first cluster, and setting in the second cluster attribute information for said cluster information copy sector.

9. The method of controlling said solid state file apparatus as claimed in claim 8, wherein said management information includes a cluster erase count, said method further comprising the steps of:

determining, when the second cluster is to be erased, the validity of said cluster information copy sector in the second cluster by comparing said cluster erase count held in said cluster information copy sector with that held in said cluster information sector in the first cluster pointed to by said identifier in said cluster information copy sector; and copying, if said cluster information copy sector is valid, said cluster information copy sector to a data area of a given one of said clusters prior to erasure of the second cluster.

10. The method of controlling said solid state file apparatus as claimed in claim 8, further comprising the steps of:

initializing the first cluster after erasure of the first cluster, including the substeps of reconstructing said management information from said cluster information copy sector, said cluster information copy sector being written in the second cluster prior to erasure of the first cluster, and creating said cluster information sector in the first cluster.

11. The method of controlling said solid state file apparatus as claimed in claim 8, further comprising the step of:

searching for said cluster information copy sector when said controller fails to read said cluster information sector for the first sector.

12. A method of controlling a solid state file apparatus having a controller and a nonvolatile memory with flash erase capability, said nonvolatile memory having a plurality of clusters, each of said clusters having a cluster information sector for storing management information including a bad sector map for the respective one of said clusters, said cluster information sector holding attribute information for said cluster information sector, each of said clusters having a data area including data sectors for storing user data, said data area being at a location other than said cluster information sector, each of said data sectors holding attribute information for said data sectors, said method comprising the steps of:

writing said user data into a first one of said clusters; and writing, when a bad sector in a given one of said clusters is detected, an identifier of the given cluster, an identifier of said bad sector, and an cluster erase count into a bad information sector of the first cluster, and setting in the first cluster attribute information for said bad information sector.

13. The method of controlling said solid state file apparatus as claimed in claim 12, wherein said management information includes a cluster erase count, said method further comprising the steps of:

determining, prior to erasure of the first cluster, the validity of said bad information sector by comparing said cluster erase count held in said bad information sector with that held in said cluster information sector in the given cluster pointed to by said identifier in said bad information sector; and copying, if said bad information sector is valid, said bad information sector to said data area of another one of said clusters prior to erasure of the first cluster.

14. The method of controlling said solid state file apparatus as claimed in claim 12, further comprising the step of:

initializing a first cluster after erasure of the first cluster, including the substeps of referencing the bad information sector, said bad information sector being written in the another cluster prior to erasure of the first cluster, and updating said bad sector map of the given cluster.

15. The method of controlling said solid state file apparatus as claimed in claim 8, wherein a random access memory is connected to said controller, said random access memory including an address translation table translating a logical address contained in a command issued by a processor connected to said controller into a physical address pointing a specific one of said sectors, further comprising the steps of:

reconstructing said address translation table by reading all of said sectors in said nonvolatile memory upon start up, said controller recording the associativity between said identifier included in said cluster information copy sector and the location of said sector in a cluster information copy sector location table in said random access memory.

16. The method of controlling said solid state file apparatus as claimed in claim 12, wherein a random access memory is connected to said controller, said random access memory including an address translation table translating a logical address contained in a command issued by a processor connected to said controller into a physical address pointing a specific one of said sectors, further comprising the steps of:

reconstructing said address translation table by reading all of said sectors in said nonvolatile memory upon start up, said controller recording the associativity between the cluster identifier included in said bad information sector and the location of said sector in a bad information sector location table in said random access memory.

* * * * *